United States Patent [19]
Halladay

[11] Patent Number: 5,713,024
[45] Date of Patent: Jan. 27, 1998

[54] COLD BOOT DATA BACKUP SYSTEM

[75] Inventor: Steven Michael Halladay, Louisville, Colo.

[73] Assignee: Exabyte Corporation, Boulder, Colo.

[21] Appl. No.: 555,306

[22] Filed: Nov. 8, 1995

Related U.S. Application Data

[63] Continuation of Ser. No. 258,510, Jun. 10, 1994, abandoned.
[51] Int. Cl.$^6$ .................................................. G06F 11/20
[52] U.S. Cl. ...................................... 395/712; 395/182.11
[58] Field of Search .................................. 395/712, 652, 395/182.11

[56] References Cited

U.S. PATENT DOCUMENTS

| | | | |
|---|---|---|---|
| 5,043,871 | 8/1991 | Nishigaki et al. | 364/200 |
| 5,089,958 | 2/1992 | Horton et al. | 395/575 |
| 5,212,784 | 5/1993 | Sparks | 395/575 |
| 5,276,860 | 1/1994 | Fortier et al. | 395/575 |
| 5,450,589 | 9/1995 | Maebayashi et al. | 395/712 |
| 5,469,573 | 11/1995 | McGill, III et al. | 395/712 |
| 5,515,502 | 5/1996 | Wood | 395/182.13 |

*Primary Examiner*—Kevin A. Kriess
*Assistant Examiner*—John Q. Chavis
*Attorney, Agent, or Firm*—Nixon & Vanderhye, P.C.

[57] ABSTRACT

The cold boot data backup apparatus maintains an index of all data file activity on a computer system and stores copies of data files in a manner to enable a user to recreate the state of the computer system at any selected point in time. This apparatus automatically formats the computer system memory in response to a failure thereof and automatically restores the operating system, all application programs and every data file that is selected by the user to be monitored and preserved by this apparatus.

24 Claims, 8 Drawing Sheets

COLD BOOT DATA BACKUP SYSTEM

This application is a file wrapper continuation of application Ser. No. 08/258,510, filed Jun. 10, 1994, now abandoned.

CROSS-REFERENCE TO RELATED APPLICATIONS

This application is related to an application Ser. No. 08/258,391, now abandoned, titled "Data Storage and Protection System", filed on Jun. 10, 1994; an application Ser. No. 08/25,582, now abandoned titled "Data Backup System for Personal Computers", filed on the same date as the present application; and an application Ser. No. 08/258,510, now abandoned, titled "Data Storage and Protection System", filed on the same date as the present application.

FIELD OF THE INVENTION

This invention relates to a data backup system that automatically produces a temporal record of all data file activity in a computer system and provides apparatus to record all activity for user identified data files, which apparatus automatically configures and restores the computer system memory upon a failure of the memory.

PROBLEM

It is a problem in computer systems to safeguard the integrity of data files stored thereon. Data files can be lost or corrupted by user error or by equipment failure. A method of recovering from such incidents is to maintain a backup copy of the data files on a backup media so that the original data file can be recreated from the backup copy. A difficulty with this philosophy is that users find the process of backing up data files burdensome and typically do not implement such procedures even when the computer system is equipped with data file backup apparatus. In addition, existing data backup systems are difficult to use when attempting to retrieve lost data files. The user must manually configure the memory, load the operating system, application programs and then proceed laboriously to reload selected data files on to the computer system memory. This process is error prone and time consuming for the user.

There presently does not exist any data backup system that is both simple to use and which provides a significantly thorough data file protection capability to warrant widespread use.

SUMMARY

The cold boot data backup system automatically monitors all data file activity on the computer system and maintains a list of all data files that are to be backed up to backup media. The cold boot data backup apparatus, on a user initiated, timed or automatic basis, then transmits the selected data files to the backup device for storage on the backup media. If a failure occurs, the cold boot data backup system performs the data file location, retrieval and restore operations, independent of the user. This system is therefore simple to use, and provides a much finer granularity of data file restore capability than prior art data backup systems.

While a specific embodiment of the cold boot data backup system has been disclosed herein, it is expected that those skilled in the art can devise alternate embodiments and utilize the concepts of this invention in other applications, which embodiments and applications fall within the scope of the claims appended hereto.

SOLUTION

The above-described problems are solved and a technical advance achieved in the field by the cold boot data backup apparatus of the present invention which maintains an index of all data file activity on a computer system and stores copies of data files in a manner to enable a user to automatically recreate the state of the computer system at any selected point in time. The cold boot data backup apparatus interposes data file monitor software between the file system and application programs resident on the computer system to intercept all communications therebetween. The monitor software extracts data file status and activity information from the intercepted communications and uses this data to maintain an event log that indicates a history of all data file activity on the computer system. The communications are then forwarded unmodified by the monitor software to their originally intended destination.

A database located in the cold boot data backup apparatus periodically retrieves the event log and uses the information contained therein to identify data files that are transmitted to a data file backup media for storage. The database writes the selected data files as well as directory information on to the backup media to enable the system to later locate and retrieve data files that were stored on the backup media to recreate a single lost data file or to recreate the state of the computer system at a selected point in time. Thus, the database maintains a three-dimensional file system on the backup media, with the file system structure representing a two-dimensional presentation of the computer system memory and the temporal sequence of changes to all the data files in the file system representing a third dimension. The operating system, all application programs and every data file that is selected by the user to be monitored and preserved by this apparatus is stored on the backup media in a time sequenced manner so that every version of each data file is resident on the backup media and the directory data on the backup media provides a history of all activity for this data file.

When the user restores the entirety of the computer system memory in response to a crash, the cold boot data backup system automatically formats the computer system memory in preparation for the retrieval of the lost data files and other memory resident software. The cold boot data backup apparatus then reviews the directory information stored on the backup media and uses this data to locate the backup copy of each application program that was resident on the memory. The cold boot data backup apparatus loads each located application program from the identified location on the backup media to the formatted computer system memory. The cold boot data backup apparatus then performs the same procedure to identify, locate and load the version of each data file that was resident on the computer system at the selected point in time when the memory was lost. The cold boot data backup apparatus then locates and retrieves each identified data file from the backup media. The retrieved data files are then written to the computer system memory to recreate the state of the computer system memory prior to the memory failure.

DETAILED DESCRIPTION

Figure 1:
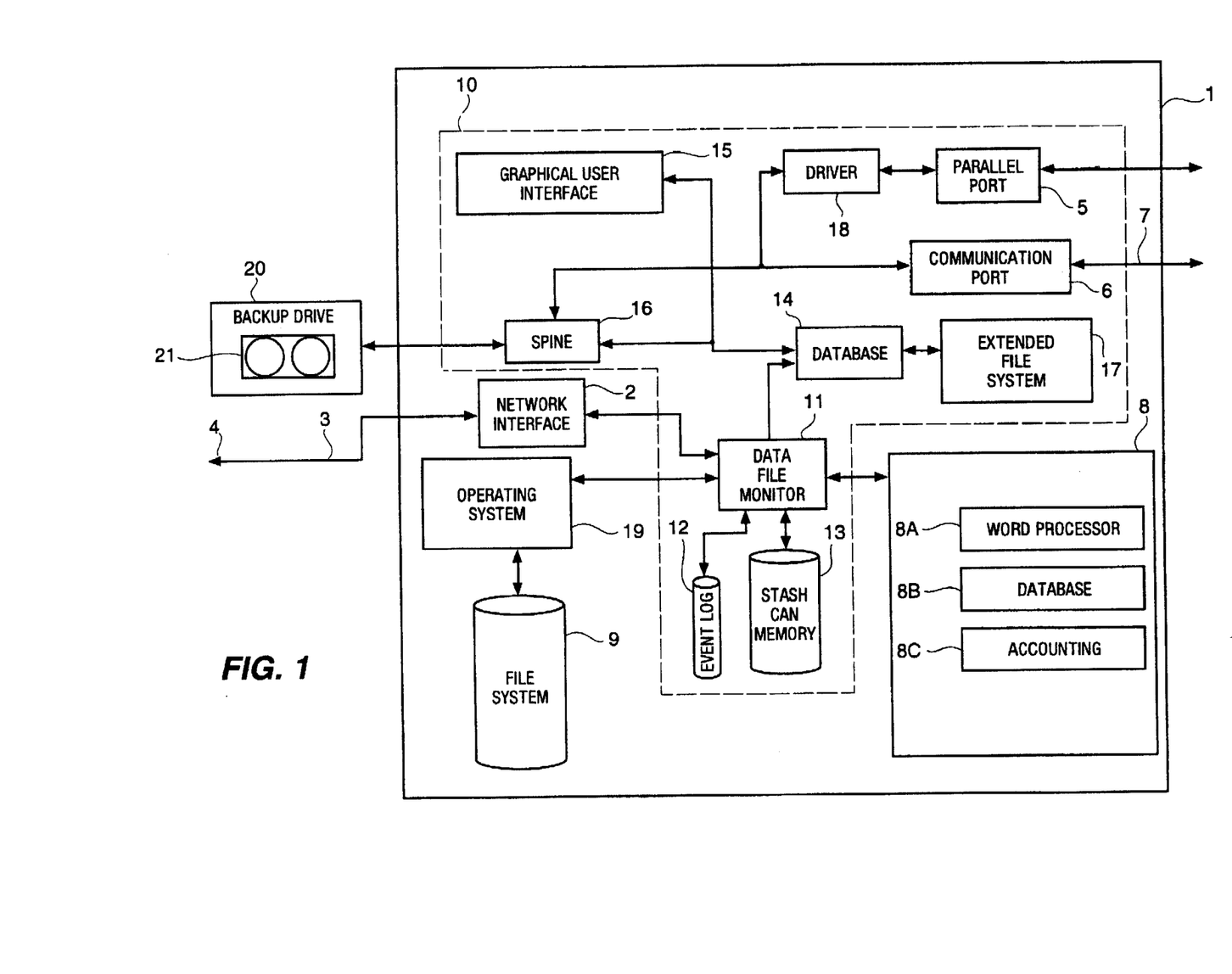
FIG. 1 illustrates in block diagram form the overall architecture of the data storage and protection system of the present invention as resident on a computer system.

FIG. 1 illustrates in block diagram form the overall architecture of the cold boot data backup apparatus 10 of the present invention which maintains an index of all data file activity on a computer system 1 and stores copies of data files in a manner to enable a user to recreate the state of the computer system 1 at any selected point in time. The computer system 1 can be any processor, whether multi-user or single user, and whether mainframe, personal computer, laptop computer, etc. It is envisioned that the computer system 1 can be pan of a network 3 wherein users external to the computer system 1 may have access to data files resident in the memory of the computer system 1. FIG. 1 therefore simply illustrates computer system 1, which is connected via network interface 2 and communication media 3 to a remote computer system 4. The presence of remote computer system 4 is not necessary for the operation of cold boot data backup apparatus 10, but is included to illustrate some of the capabilities of cold boot data backup apparatus 10.

The cold boot data backup apparatus 10 is installed on computer system 1 and serves to store selected data files on a backup media 21 that is located in backup drive 20. The backup media 21 is a rewriteable media, and can be mountable magnetic tape, fixed disk drive media, mountable disk drive media, disk drive array, or any other rewriteable media. The backup drive 20 is typically a separate device that is connected to computer system 1 via an interface, such as the parallel port 5 of the computer system 1 or a data communication port 6. The backup device 20 can be collocated with computer system 1 or can be located remote from computer system 1 and connected thereto via a data communication link 7 or network 3.

Figure 3:
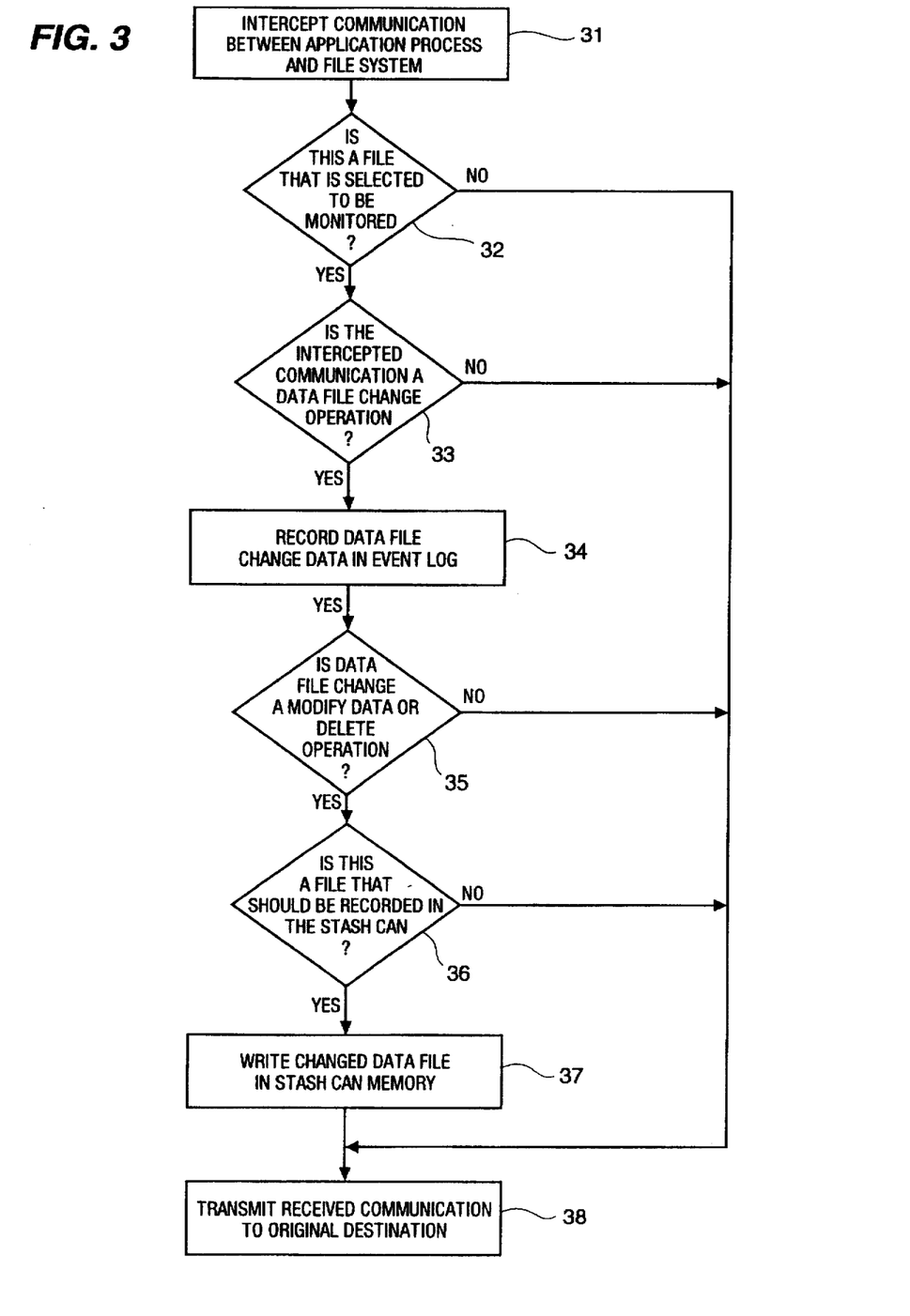
FIG. 3 illustrates in flow diagram form the operational steps taken by the data file monitor its operation.

The computer system 1 includes an operating system 7, a plurality of application programs 8 and a file system 9 in conventional configuration. The cold boot data backup system 10 interposes data file monitor 11 between the file system 9 and the application programs 8 resident on the computer system 1 to intercept all communication therebetween. The terms "interposed" and "intercept", as used herein, are broadly construed, wherein it is envisioned that the communications generated by both application programs 8 and file system 9 are routed to data file monitor 11. The operation of the data file monitor 11 is disclosed in flow diagram form in FIG. 3. At step 31, the data file monitor 11 intercepts or receives a communication between one of the application programs 8 and the file system 9. The data file monitor 11 reviews this communication at step 32 to determine whether this communication results in a data file change. Data file changes can include data file create, write, delete, copy, move, directory create, delete. If the received communication does not result in one of these events, then processing returns to step 31 to await the next communication between the application programs 8 and the file system 9. If a data file change is detected, at step 33, the data file monitor 11 extracts data file status and activity information from the received communications and uses this data to maintain an event log 12 that indicates a history of all presently occurring data file activity on the computer system 1. The data file monitor 11 also determines whether the operation is a data file delete at step 34. If the user has deleted a data file, the data file monitor 11 writes this data file into a stash can memory 13 at step 37. Processing then proceeds to step 36, as it does when no delete operation is being executed. At step 36, the communications are then forwarded unmodified by the data file monitor 11 to their originally intended destination. Thus, the communications can be directly routed to data file monitor 11 and stored therein for a period of time or can be passed through data file monitor 11 without substantial delay and the required data extracted therefrom while the communications are passed through data file monitor 11.

Event Log

The event log 12 consists of a data file typically maintained by data file monitor 11 in the memory of computer system 1. The event log 12 includes a list of all data files resident in computer system 1 that have been subject to change since the last data file backup activity on computer system 1. The monitored changes typically include data file create, write, delete, copy, move, directory create, delete. For each of these data file changes, the data file monitor 11 creates an entry in event log 12 that identifies the data directory/data file, the nature of the change, extent of the data file, the time that this change occurred and any other pertinent administrative information, such as user identification, that my be pertinent to the operation of the cold boot data backup system 10.

Initiation of Data Protection Process

Figure 2:
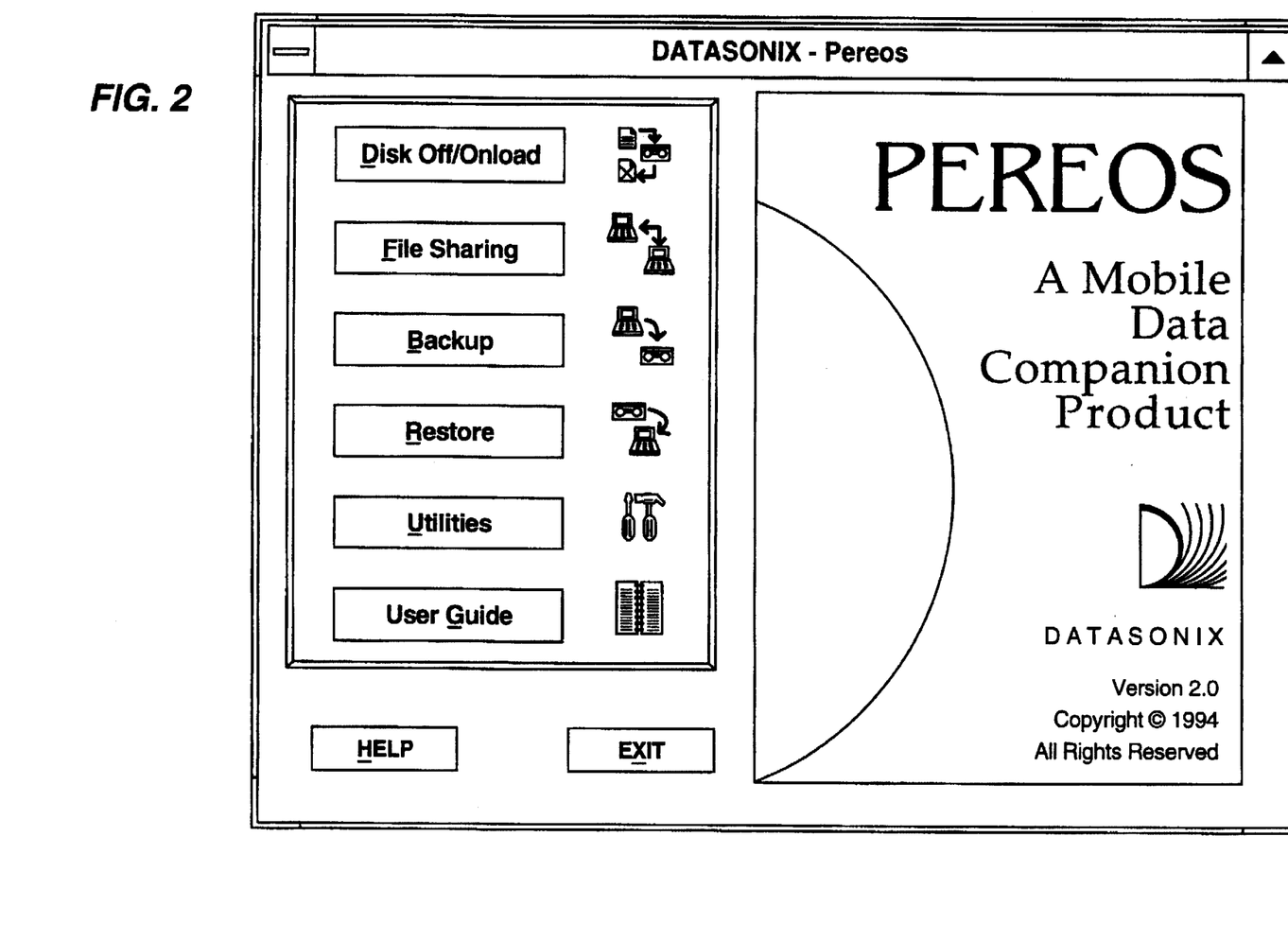
FIG. 2 illustrates a typical main menu screen that is presented to the user by the data storage a protection system.

A database 14 located in the cold boot data backup apparatus 10 retrieves the event log 12 and uses the information contained therein to identify data files that are to be transmitted to a data file backup media 21 for storage. The data file backup process is a function of the procedure defined by the user. There is a significant amount of customization that can take place within cold boot data backup system 10 to satisfy the needs of individual users. In particular, graphical user interface 15 is provided to enable the user to activate and control the operation of cold boot data backup system 10. There are typically a plurality of user interface screens that can be displayed to the user by cold boot data backup system 10 and only a small number of these are disclosed herein for the purpose of simplicity of description. Thus, FIG. 2 illustrates the typical main menu screen presented to the user which enables the user to select the data storage and protection parameters, and which also enables the user to select one of the many features that are available on the cold boot data backup system 10.

A primary function of the cold boot data backup system 10 is to backup data files that are created and modified by the user on to a backup media 21 for safekeeping. To accomplish this goal, it is expected that a user first backs up the entirety of the data stored in the memory of computer system 1. In a personal computer, this backup is a dump of the contents of the hard drive. The user then programs the cold boot data backup system 10 to "track" selected data files, directories, subdirectories, or even the entire memory of computer system 1. The cold boot data backup system 10, as noted above, monitors data file activity on computer system 1 and stores all versions of the identified data files on the backup media 21. This process records the incremental changes to the memory of computer system 1 over time and provides a total record of the selected data fries.

The user accesses the cold boot data backup system 10 via the standard application program activation process native to computer system 1. The cold boot data backup system 10, when activated, presents the user with the display illustrated in FIG. 2. The configuration selection activates the capability for the user to define the mode of data backup and to identify the elements that are to be protected. This process is similar to existing data backup systems and is not described in great detail herein in the interest of brevity and clarity of description.

Data File Backup Process

Figure 4:
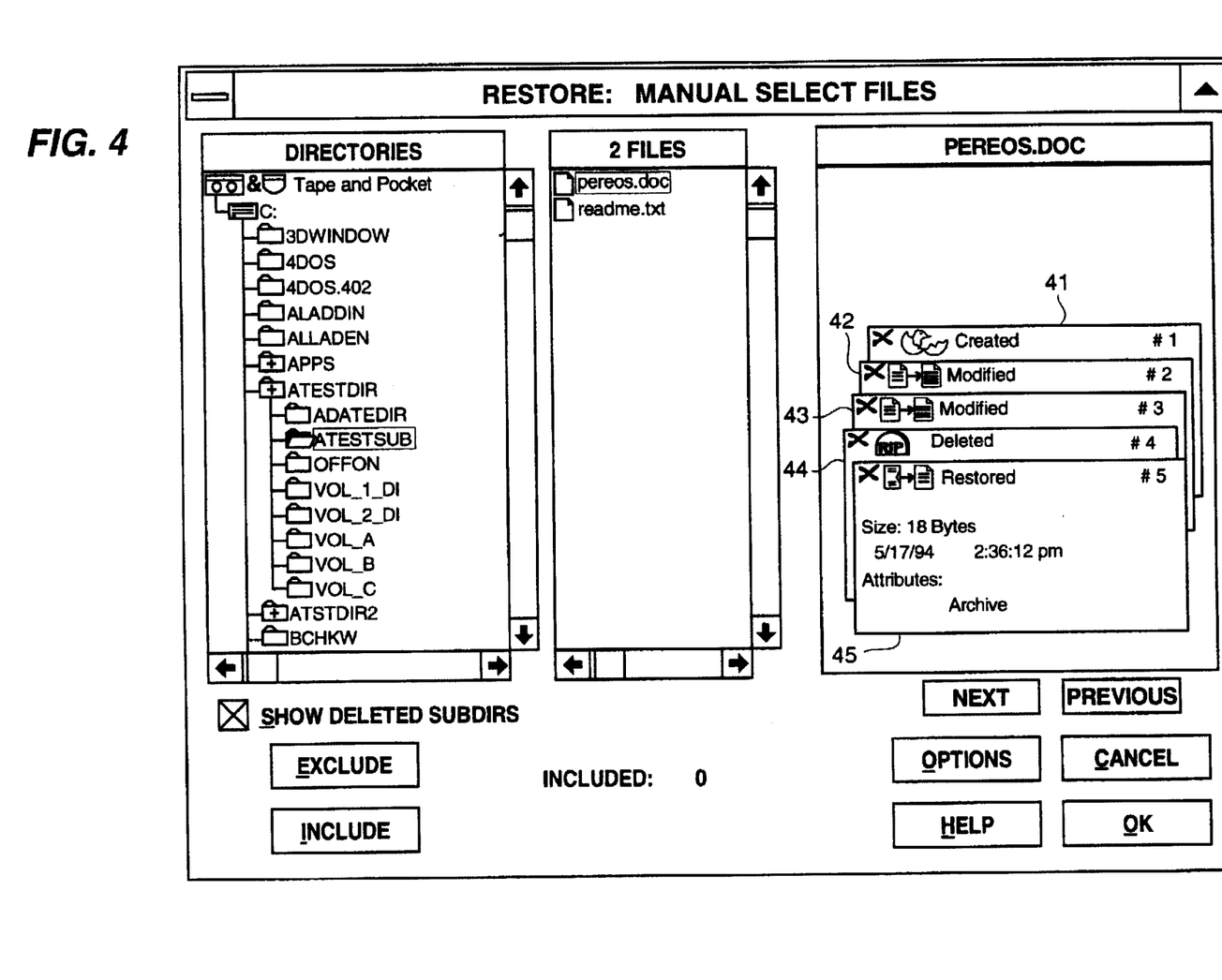
FIG. 4 illustrates a conceptual view of the data stored in the extended file system.

Regardless of the initiation mode, the graphical user interface 15 transmits data to database 14 to define the data file backup procedure extant in computer system 1 for the identified user. The user screen of FIG. 4 illustrates conceptually a typical data file backup procedure. The database 14, when activated, reads the contents of event log 12 to determine what data files have been changed since the last backup process was activated. The database 14 includes an extended file system 17 which is a definition of the file system active in computer system 1. Included in extended file system 17 is a temporally oriented listing of all data files identified by the user as requiring protection. The temporal listing thereby provides a three-dimensional version of file system 9, with the tree-like structure of file system 9, native to the operating system 7, being a two-dimensional representation subdirectories, and data files that comprise file system 9. Thus, the set of temporally ordered versions of each data file provides the third dimension to this extended file system 17. For example, as shown in FIG. 4, a first instance 41 of a data file represents the initial creation of the data file. As users access this data file, changes are made to the data file and recorded on the backup media 21 as new instances of the data file 41. Each successively modified version 42, 43 of the data file 41 represents a time-wise progression of the data file 41. The various versions 4* of data file 41 are noted in extended file system 17 so that a user can identify a particular version of the data file 41 that is desired when the data file 41 is to be restored or a prior version of the data file viewed. The entries in extended file system 17 include markers 44 to illustrate that the data file 4* was restored as version 43 to the memory of computer system 1 at a particular point in time. Furthermore, the deletion of this data file 4* is noted as entry 45 and a copy of the data file 4* as it existed at the time of deletion is temporarily stored in stash can 13 and later written to the backup media 21. The extended file system 17 preserves the data from which file system 9 can be recreated, at any selected point in time, since the cold boot data backup system 10 was activated in computer system 1. The baseline of extended file system 17 is the contents of file system 9 at the time the cold boot data backup system 10 was activated.

Spine System

The database 14 writes the selected data files as well as directory information on to the backup media 21 to enable the cold boot data backup system 10 to later locate and retrieve data files that were stored on the backup media 21 to recreate a single lost data file or to recreate the state of the computer system 1 at a selected point in time. The database 14 provides the data file in need of backup information to spine system 16 which maintains a plan, which is a listing of all data files that require backup the next time that the backup process is activated. The spine system 16 places the identified data files in logical format and, when the backup process is activated, transmits each data file seriatim to the driver 18 which comprises a state machine that converts the data file to the physical format required to transmit the data file via parallel port 5 (for example) to the backup device 20 for storage on backup media 21.

The extended file system 17 can obviously grow in extent to occupy a significant amount of memory of computer system 1. To limit the size of extended file system 17, the oldest section of extended file system 17 can be pruned from extended file system 17 and written to backup media 21 as with any other data file. The extended file system 17 then notes the existence of the pruned section of extended file system 17 located on backup media 21. If the user requests access to a data file that was stored on backup media 21 and whose extended file system information is also written to backup media 21, then spine system 16 must first retrieve the pruned section of extended file system 17 from the backup media 21 to obtain the information relating to the location of the requested data file.

Backup Device

The backup device 20 is connected to the computer system via a communication interface, such as parallel port 5. The backup device comprises a device that uses a rewriteable media to store large quantities of data for cold boot data backup system 10. One example of such a backup device 20 is a tape drive that uses tape cassettes to store data. The data stored on this backup media 21 can require the use of multiple media elements, and cold boot data backup system 10 maintains a record of how many backup media elements are used and also write data file directory information on to the media elements. Thus, the data file backup process results in a plurality of data files being written on backup media 21, which can be magnetic tape cassette n. The spine system 16 of cold boot data backup system 10 writes a directory listing of all the data files that have been written on to the backup media 21 in this operation on the backup media 21, typically the end of the media so it can be simply and quickly located. Thus, the backup media 21 is self defining, in that the directory data written thereon denotes which data files are written on the backup media 21 and their temporal definition.

Thus, the database 14 maintains a three-dimensional file system on the backup media 21, with the file system structure representing a two-dimensional presentation of the computer system memory and the temporal sequence of changes to all the data files in the file system representing a third dimension. Every data file that is selected by the user to be monitored and preserved by cold boot data backup system 10 is stored on the backup media 21 in a time sequenced manner so that every version of the data file is resident on the backup media 21 and the directory data on the backup media 21 provides a history of all activity for this data file.

Data File Retrieval/Reconstruction

When the user must restore the entirety of the computer system memory in response to a crash, the cold boot data backup system 10 reviews the directory information stored on the backup media 21 and uses this data to identify the version of each data file that was resident on the computer system 1 at the selected point in time. The directory information also indicates the physical location of each of these data file versions on the backup media 21. The cold boot data backup system 10 then locates and retrieves each identified data file from the backup media 21. The retrieved data files are then written to the computer system memory to recreate the state of the computer system memory at the selected point in time.

Cold Boot of Computer System Memory

Figure 5:
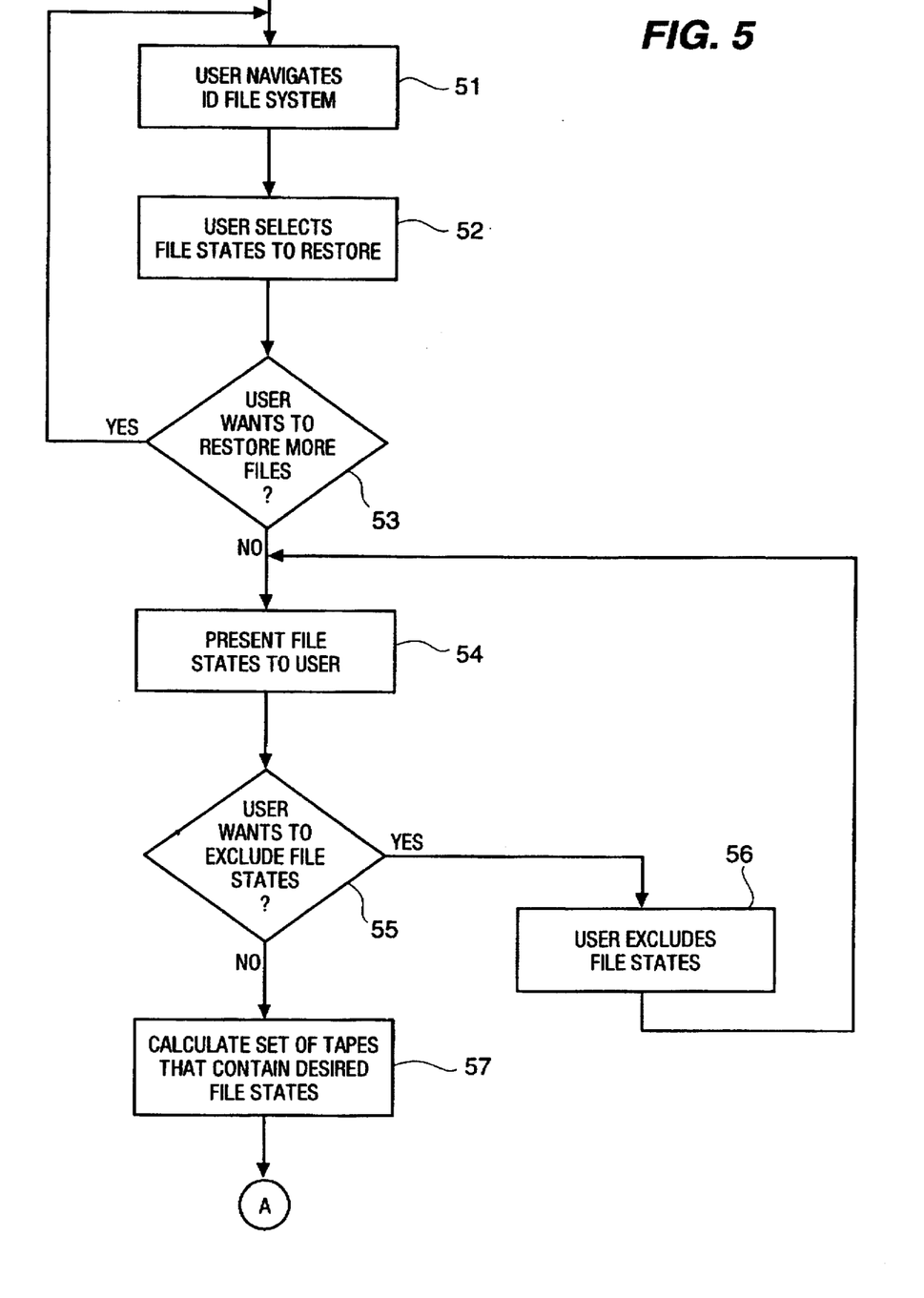
FIGS. 5, 6 illustrates a conceptual view of the data stored in the extended file data storage and protection system of the present invention to restore data files.
Figure 6:
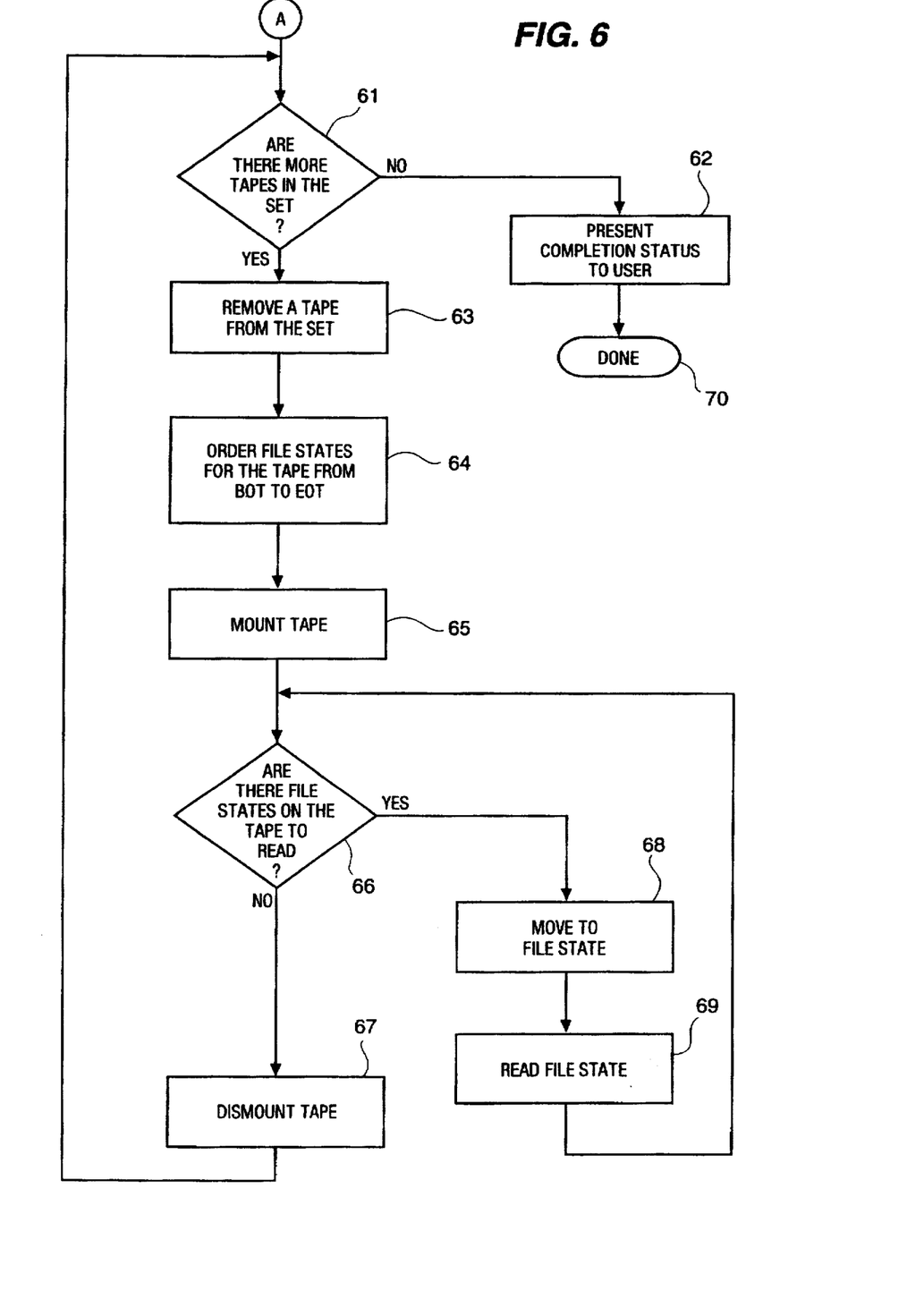

FIGS. 5 and 6 illustrate in flow diagram form the operational steps taken by the cold boot data backup system 10 to restore the contents of the memory of computer system 1 after a memory failure has occurred. An example of a memory failure in a personal computer is where the hard drive that contains the operating system, all application programs and user data files has failed and all the data stored thereon is lost. The user would replace the hard drive with a new hard drive device, which must be installed, formatted, configured and then repopulated with the lost application programs and user data. This task is time consuming and, with present data backup systems, incomplete at best. The user typically desires to restore the computer system 1 to the state that existed at the instant the computer system memory failed. Existing data backup systems can at best restore the computer system 1 to the date of the last backup operation, and then only with extensive user intervention, since the application programs are typically not backed up and old little used data files must be recovered manually by the user or may even be lost on old overwritten backup tapes.

The cold boot data backup system 10 operates in the event described above to automatically recreate the state of the memory of computer system 1. This is accomplished when the cold boot data backup apparatus 10 formats the newly installed computer system memory (hard drive). The cold boot data backup apparatus 10 then identifies, locates and loads all application programs from the backup media 21 on to the computer system memory. The cold boot data backup apparatus 10 then identifies the version of each data file that was resident on the computer system 1 at the selected point in time when the memory was lost. The cold boot data backup apparatus 10 then locates and retrieves each identified data file from the backup media 21. The retrieved data files are then written to the computer system memory to automatically recreate the state of the computer system memory as it existed prior to the memory failure, without extensive user effort.

Building the Cold Boot Package

The cold boot process must be customized for the computer system 1 on which it is to be used. This is because each computer system 1 is uniquely configured and populated with application programs. A record must therefore be created to define the baseline system configuration. This process is illustrated in flow diagram form in FIG. 7 in the context of the computer system 1 being a personal computer having a hard drive on which the operating system, application programs and program data is stored, as well as at least one floppy disk drive. The cold boot apparatus 10 typically consists of an application program resident on computer system 1, which is used as described herein to create a cold boot floppy disk which is used to cold boot the computer system I in the event the memory of computer system 1 false and must be completely restored.

Figure 7:
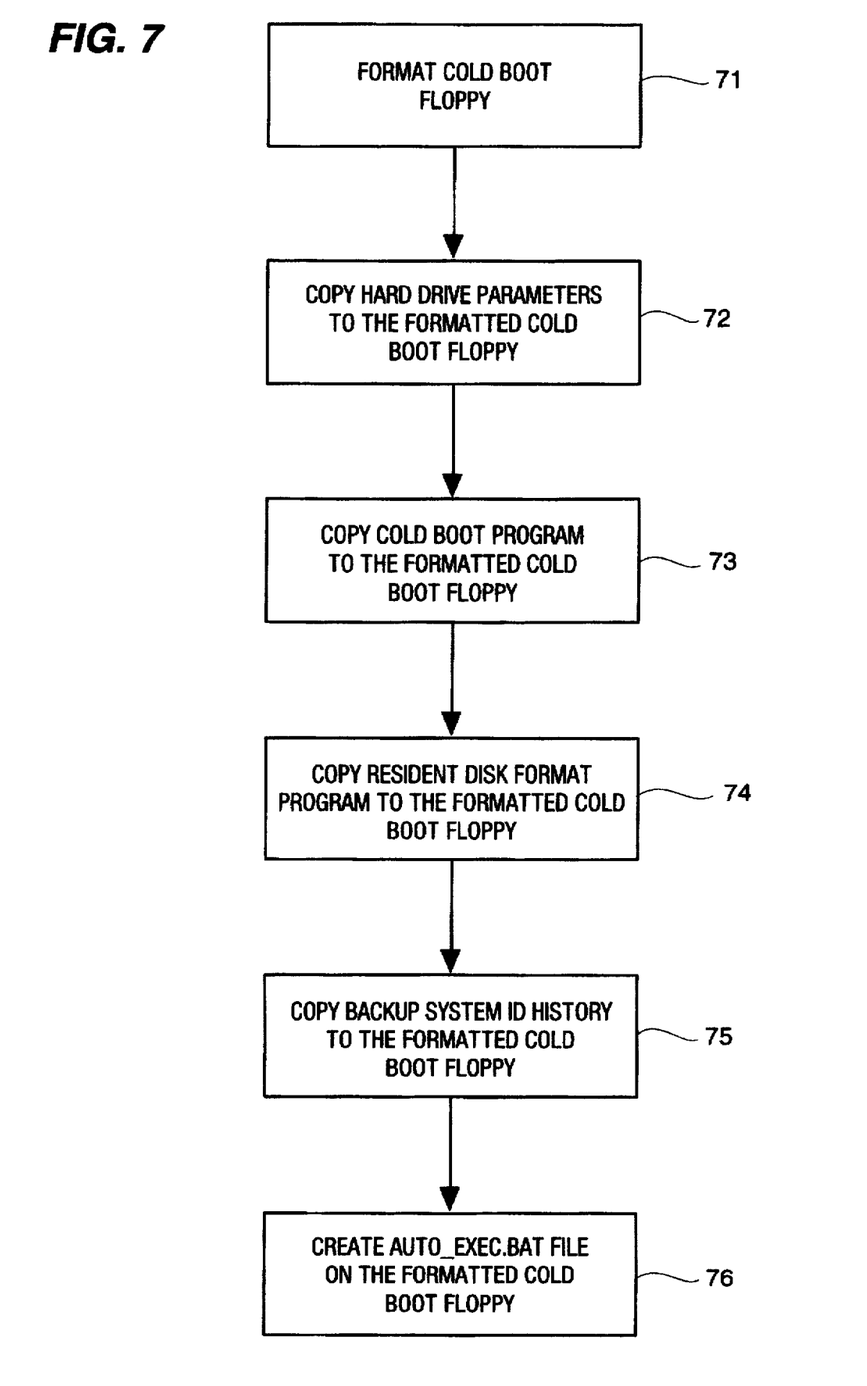
FIGS. 7 and 8 illustrate in flow diagram form the operational steps taken by the data storage and protection system of the present invention to cold boot the computer system memory.

At step 71, the user formats a floppy disk that has been inserted into the floppy disk drive to create a system bootable disk. This floppy disk becomes the cold boot floppy disk that is used to automatically initiate and execute the cold boot hard drive restore process. The cold boot apparatus 10 populates the cold boot floppy disk with the required programs and data to execute the hard drive restore process. This process begins at step 72, wherein the cold boot apparatus 10 copies the computer system hard disk parameters on to the cold boot floppy disk, which parameters include format options, disk partition information, etc. The cold boot floppy disk creation operation proceeds with the cold boot apparatus 10 copying the cold boot application program at step 73 on to the cold boot floppy disk. At step 74, the cold boot apparatus 10 copies the computer system's resident format command program on to the cold boot floppy disk. The cold boot apparatus 10 at step 75 next copies the backup system ID history on to the cold boot floppy disk. Finally, at step 76 the cold boot apparatus 10 creates an auto_exec.bat file on the cold boot floppy disk. At this point, the cold boot floppy disk has been populated with all the programs and information that is required to cold boot a replacement hard drive, using the cold boot floppy disk and the backup media.

Cold Boot Process

Figure 8:
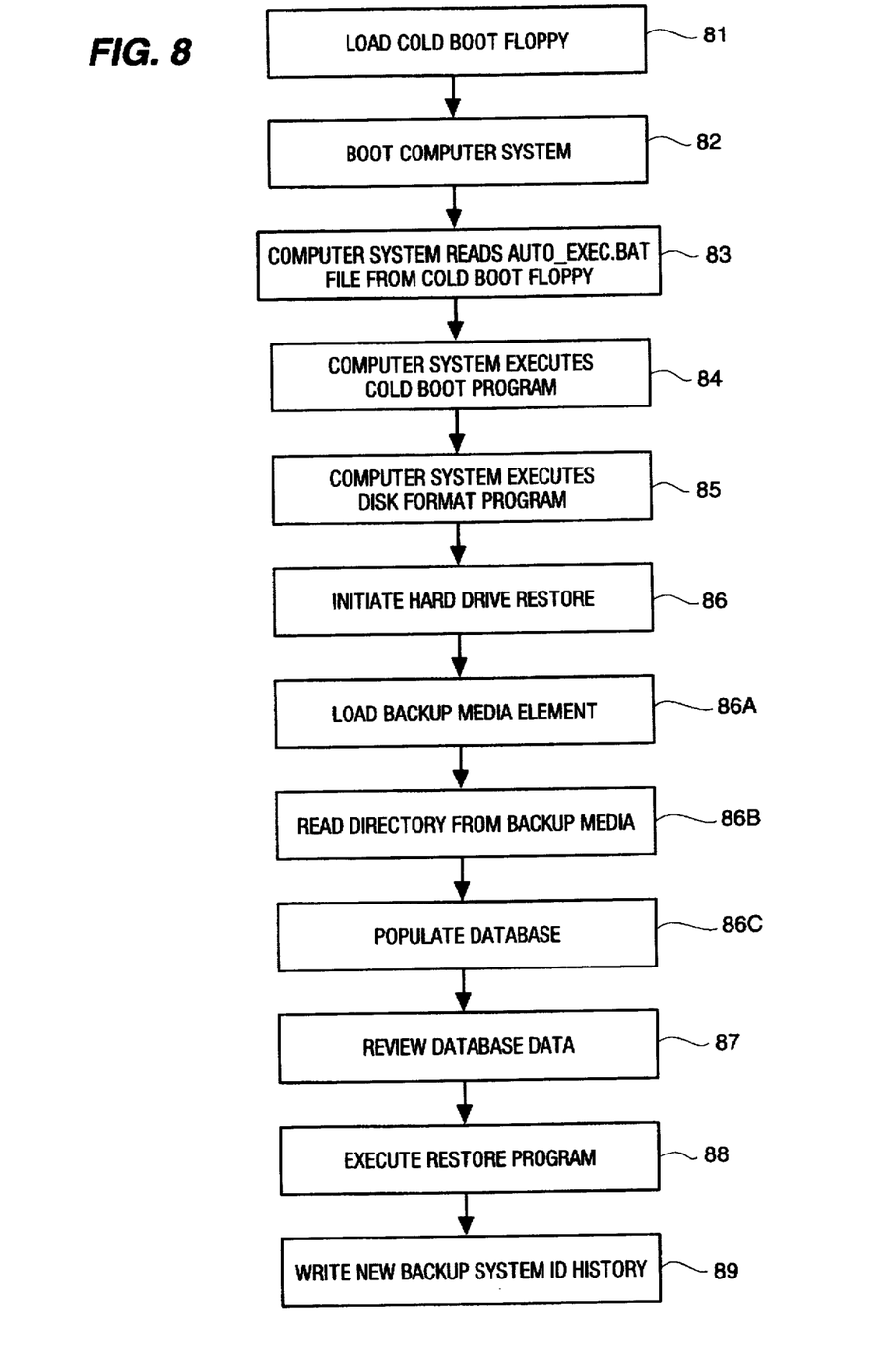

The cold boot process is typically initiated by the user in response to the failure of the hard drive, which has caused the loss of all the data and application programs that were stored thereon. The user initiates the cold boot process, which is illustrated in flow diagram form in FIG. 8, by loading the cold boot floppy disk into the floppy drive of the computer system at step 81. At step 82, the user boots the computer system 1, which searches the hard drive and the cold boot floppy disk for the proper startup program. The computer system 1 identifies the floppy disk as a bootable disk and reads the cold boot disk to locate the auto_exec.bat file written thereon. The computer system 1, at step 83, reads the auto_exec.bat file from the cold boot floppy disk, which auto_exec.bat file directs the computer system 1 to the cold boot application program that is written on the cold boot floppy disk. At step 84, the computer system 1 executes the cold boot application program, which instructs the computer system 1 to run the disk format operation, which is also stored on the cold boot floppy disk, on the newly installed hard drive. At step 85, the computer system 1 reads the disk format program from the cold boot floppy disk and initiates a hard drive format process which formats the hard drive in well-known fashion and restores the hard drive parameters, establishing partitions, etc. The cold boot application program at step 86 next initiates the hard drive restore process which populates the hard drive with all the application programs and application data to recreate the state of the hard drive immediately prior to the hard drive failure. The cold boot program instructs the user at step 86A to load the first backup media 21 into the backup drive 20 and proceeds at step 86B to read the directory information from this backup media 21. The backup media 21 is searched for full and incremental backup sessions, each of which are identified via system IDs in the ID history that was written by the cold boot apparatus 10 on the cold boot floppy disk as noted above. The data that is retrieved from the backup media 21 regarding the full and incremental backup sessions are used by the cold boot program at step 86C to create a temporary data base. The backup media read process of steps 86A and 86B are repeated for each backup media that has been created for the computer system 1 until at step 86C it is determined that the last backup media 21 has been read. Processing then advances to step 87 wherein the cold boot application program reviews the data stored in the temporary database to perform a disk restore operation, to restore the hard drive to the state immediately preceding its failure. This restore process is described above. Once the application programs and application data has been restored to the hard drive from the backup media 21, a new system ID is created at step 89 and also written into the system ID history on the hard drive.

We claim:

1. A cold boot data backup apparatus for automatically restoring data files stored in a memory of a computer system in response to a failure of said memory, using a backup media that is connected to said computer system which has stored thereon a copy of data files written in said memory, every version of data files changed by said computer system, comprising:

means for acquiring data indicative of data file activity on said computer system;

means, responsive to said acquired data file activity data, for generating data indicative of data files that have been changed by said data file activity;

means for retrieving only selected data files, identified by said generated data and user-input data file backup identification data, that have been changed by said data file activity from said memory;

means for storing in their entirety said retrieved data files, exclusive of other data files stored in said memory, on a backup media to produce a time ordered sequence on said backup media of every version of said selected data files;

means for automatically restoring said memory to include said data files, written in said memory and changed by said computer system, to a state substantially as they were prior to said failure using said backup media, the restoring means performing the functions of:

(1) automatically copying on a first storage medium the following:
 (a) parameters of the computer system memory;
 (b) a disk cold boot program;
 (c) a resident format command program of the computer system:
 (d) on a backup system identification history; and
 (e) an auto_exec.bat file; and then, after booting up of the computer system using the first storage medium. automatically (2) executing the disk cold boot program wherein execution of the disk cold boot program causes:
 (a) executing of the resident format command program for formatting the memory:
 (b) generating a prompt to insert the backup media into a backup media device; and, once the backup media has been inserted.
 (c) using directory information read from the backup media and the backup system identification history to obtain the data files of the computer system memory at a predetermined point in time;
 (d) using the data files acquired in function (2) (c) to perform a restoration of the memory.

2. The apparatus of claim 1 wherein said cold boot data backup apparatus further comprises:

means for creating a directory table of data file information indicative of all data files transmitted to said backup media during a backup operation; and means for storing said directory table on said backup media upon completion of storage of a last data file listed in said data file change data.

3. The apparatus of claim 2 wherein said data file change data generating means comprises:

means for transmitting a segment of said data file change data to said backup media.

4. The apparatus of claim 1 wherein said automatically restoring means comprises:

means, responsive to said automatically reading means generating data that identifies application programs resident on said backup media for writing said application programs from said backup media on to said memory.

5. The apparatus of claim 4 wherein said automatically restoring means further comprises:

means for writing directory data to said memory to identify said application programs loaded on said memory from said backup media.

6. The apparatus of claim 1 wherein said automatically restoring means comprises:

means, stored on said backup media, for automatically formatting said memory.

7. The apparatus of claim 6 wherein said auotmatically restoring means further comprises:

means for loading application programs from said backup media to said memory; and means for writing directory data to said memory to identify said application programs loaded on to said memory from said backup media.

8. The apparatus of claim 7 wherein said auotmatically restoring means further comprises:

means for loading identified most recent versions of application program data files from dais backup media to said memory.

9. The apparatus of claim 8 wherein said auotmatically restoring means further comprises:

means for writing directory data to said memory to identify said identified most recent versions of application program data files loaded from said backup media to said memory.

10. A method of cold boot data backup for automatically restoring data files stored in a memory of a computer system in response to a failure of said memory, using a backup media that is connected to said computer system and has stored thereon a copy of data files written in said memory, every version of data files changed by said computer system, comprising the steps of:

acquiring data indicative of data file activity on said computer system;

generating, in response to said acquired data file activity data, data indicative of data files that have been changed by said data file activity;

retrieving only selected data files, identified by said generated data and user-input data file backup identification data, that have been changed by said data file activity from said memory;

storing said retrieved data files in their entirety, exclusive of other data files stored in said memory, on a backup media to produce a time ordered sequence on said backup media of every version of said selected data files; and automatically restoring said memory to include said data files, written in said memory and changed by said computer system, to a state substantially as they were prior to said failure using said backup media, the step of restoring comprising:

(1) automatically copying on a first storage medium the following:
 (a) parameters of the computer system memory;
 (b) a disk cold boot program;
 (c) a resident format command program of the computer system:

(d) backup system identification history; and (e) an auto_exec.bat file: and then, after booting up of the computer system using the first storage medium, automatically (2) executing the disk cold boot program, wherein execution of the disk cold boot program causes:

(a) executing of the resident format command program for formatting the memory;

(b) generating a prompt to insert the memory into a backup media device; and, once the backup media has been inserted, (c) using directory information read from the backup media and the backup system identification history to obtain the data files of the computer system memory at a predetermined point in time;

(d) using the data files acquired in step (2) (c) to perform a restoration of the memory.

11. The method of claim 10 further comprising the steps of: further comprising the steps of:

creating a directory table of data file information indicative of all data files transmitted to said backup media during a backup operation; and transmitting said directory table to said backup media upon completion of storage of a last data file listed in said data file change data.

12. The method of claim 11 wherein said step of data file change data generating comprises:

transmitting a segment of said data file change data for storage on said backup media.

13. The method of claim 10 wherein said step of automatically restoring comprises:

generating data, in response to said step of automatically reading, that identifies application programs resident on said backup media for writing said applications programs from said backup media on to said memory.

14. The method of claim 13 wherein said step of auotmatically restoring further comprises:

writing directory data to said memory to identify said application programs loaded on said memory from said backup media.

15. The method of claim 10 wherein said step of automatically restoring comprises:

automatically formatting said memory from said backup media.

16. The method of claim 15 wherein said step of automatically restoring further comprises:

loading application programs from said backup media to said memory; and writing directory data to said memory to identify said application programs loaded on to said memory from said backup media.

17. The method of claim 16 wherein said step of automatically restoring further comprises:

loading identified most recent versions of application program data files from said backup media to said memory.

18. The method of claim 17 wherein said step of automatically restoring further comprises:

writing directory data to said memory to identify said identified most recent versions of application program data files loaded from said backup media to said memory.

19. A method of restoring the contents of a computer system hard disk using a set of executable instructions resident on the computer system, the method comprising:

(1) automatically copying on a first storage medium the following:

(a) parameters of the computer system hard disk;

(b) a disk cold boot program;

(c) a resident format command program of the computer system;

(d) a backup system identification history; and (e) an auto_exec.bat file; and then, after booting up of the computer system using the first storage medium, automatically (2) executing the disk cold boot program, wherein execution of the disk cold boot program causes:

(a) executing of the resident format command program for formatting the hard disk;

(b) generating a prompt to insert a second storage medium into a second storage medium device; and, once the second storage medium has been inserted, (c) using directory information read from the second storage medium and the backup system identification history to obtain data reflecting state of the computer system hard disk at a predetermined point in time;

(d) using the data acquired in step (2) (c) to perform a restoration of the hard disk.

20. The method of claim 19, wherein steps (2) (c) and (2) (d) include using directory information read from the second storage medium and the backup system identification history to populate a database with data read from the second storage medium, and then using the database to perform a restoration of the hard disk.

21. The method of claim 19, wherein the first storage medium is a floppy disk.

22. The method of claim 19, wherein the second storage medium is magnetic tape.

23. The method of claim 19, wherein step (2) is automatically performed upon loading of the first storage medium into a peripheral storage device of the computer system.

24. The method of claim 19, wherein the hard disk parameters include format options and disk partition information.

* * * * *